US009603205B2

(12) United States Patent
Gao et al.

(10) Patent No.: US 9,603,205 B2
(45) Date of Patent: Mar. 21, 2017

(54) MULTI-FUNCTION TERMINAL CONFIGURABLE TO IMPLEMENT TWO FUNCTIONALITIES

(71) Applicant: Dialog Semiconductor Inc., Campbell, CA (US)

(72) Inventors: Xiaolin Gao, Santa Clara, CA (US); Ping Lo, Santa Clara, CA (US); Juyoung Yoon, San Ramon, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 157 days.

(21) Appl. No.: 14/325,009

(22) Filed: Jul. 7, 2014

(65) Prior Publication Data
US 2016/0007417 A1    Jan. 7, 2016

(51) Int. Cl.
| | | |
|---|---|---|
| *H02M 7/515* | (2007.01) | |
| *H05B 33/08* | (2006.01) | |
| *H02M 1/36* | (2007.01) | |
| *H02M 1/32* | (2007.01) | |
| *H02M 3/335* | (2006.01) | |

(52) U.S. Cl.
CPC .......... *H05B 33/0815* (2013.01); *H02M 1/32* (2013.01); *H02M 1/36* (2013.01); *H02M 3/33507* (2013.01); *H05B 33/0845* (2013.01)

(58) Field of Classification Search
CPC ................................................ H02M 3/33507
USPC ............ 363/49, 52, 53, 21.01, 21.04, 21.12, 363/123–125
See application file for complete search history.

(56) References Cited

U.S. PATENT DOCUMENTS

| | | | | |
|---|---|---|---|---|
| 5,459,652 A | * | 10/1995 | Faulk | H02M 1/36 323/901 |
| 6,348,717 B1 | | 2/2002 | Miki | |
| 6,643,151 B1 | * | 11/2003 | Nebrigic | H01M 6/5044 307/110 |
| 6,665,197 B2 | * | 12/2003 | Gong | H02M 3/33507 363/131 |
| 6,744,612 B2 | * | 6/2004 | Chen | H02H 9/001 361/111 |

(Continued)

FOREIGN PATENT DOCUMENTS

WO    WO 2013/027118 A1    2/2013

OTHER PUBLICATIONS

PCT International Search Report and Written Opinion, PCT Application No. PCT/US15/37241, Sep. 18, 2015, 13 pages.

(Continued)

*Primary Examiner* — Adolf Berhane
*Assistant Examiner* — Nusrat Quddus
(74) *Attorney, Agent, or Firm* — Fenwick & West LLP (57) ABSTRACT

Embodiments described herein describe a power supply controller configured to control a power supply that provides power to an output load via a power supply transformer. The power supply controller includes a first terminal that provides supply voltage to the controller. The controller also includes a second terminal coupled to a switch external to the controller, the switch is part of a power converter controlled by the controller, wherein the second terminal is used for an initial power up of the power converter when the switch is turned on and used for a second functionality when the switch is turned off.

11 Claims, 5 Drawing Sheets

(56) References Cited

U.S. PATENT DOCUMENTS

| | | | |
|---|---|---|---|
| 8,787,046 B2* | 7/2014 | Hsieh | H02M 3/33523 363/21.08 |
| 2002/0150140 A1* | 10/2002 | Julicher | G01K 1/024 374/120 |
| 2004/0218408 A1 | 11/2004 | Colbeck et al. | |
| 2004/0245946 A1* | 12/2004 | Halter | H01L 25/0753 315/312 |
| 2004/0252530 A1* | 12/2004 | Smidt | H02M 3/33584 363/21.12 |
| 2004/0263105 A1 | 12/2004 | Tsai et al. | |
| 2007/0182347 A1* | 8/2007 | Shteynberg | H05B 33/0815 315/312 |
| 2008/0284714 A1* | 11/2008 | Wu | H05B 33/0815 345/102 |
| 2009/0244931 A1 | 10/2009 | Brkovic | |
| 2011/0267853 A1 | 11/2011 | Yang et al. | |
| 2012/0062133 A1 | 3/2012 | Cubias | |
| 2012/0176819 A1* | 7/2012 | Gao | H02M 1/36 363/21.12 |
| 2012/0212144 A1* | 8/2012 | Hayashi | H05B 33/089 315/193 |
| 2012/0274232 A1* | 11/2012 | Xu | H05B 33/0815 315/294 |
| 2012/0287682 A1 | 11/2012 | Zhang et al. | |
| 2013/0003421 A1 | 1/2013 | Fang | |
| 2013/0077363 A1* | 3/2013 | Shen | H05B 33/0815 363/78 |
| 2014/0016376 A1 | 1/2014 | Gao et al. | |
| 2014/0089722 A1 | 3/2014 | D'Angelo et al. | |
| 2014/0268937 A1* | 9/2014 | Krishnamoorthy | H02M 1/36 363/49 |
| 2016/0020691 A1* | 1/2016 | Yoon | H02M 1/4208 323/284 |

OTHER PUBLICATIONS

PCT International Preliminary Report on Patentability, PCT Application No. PCT/US15/37241, Jun. 6, 2016, 11 pages.

PCT International Preliminary Report on Patentability, PCT International Application No. PCT/US15/37241, Aug. 23, 2016, 18 pages.

\* cited by examiner

MULTI-FUNCTION TERMINAL CONFIGURABLE TO IMPLEMENT TWO FUNCTIONALITIES

BACKGROUND

Field of the Disclosure

This disclosure pertains generally to power supplies and more specifically to compactness of power supply controllers.

Description of the Related Art

The compactness and efficiency of power supplies is an increasing concern to users and manufacturers of electronics. Switching power supplies with pulse width and pulse frequency modulated controllers offer both compactness and efficiency in a number of different topologies. Switching power supply controllers are available in a single integrated circuit chip or package having some number of external connection pins or terminals. As with many other types of integrated circuit chips or packages, limiting the number of external connection terminals of a power supply package is advantageous, allowing both a reduced form factor and over-all cost.

However, as the complexity of electronic devices is increasing, the complexity of power supply specifications is also increasing. It is often required for a power supply to operate in a number of different operational modes based on many different factors. Therefore, it is desirable to provide configurability of the power supply to achieve a desired outcome by the system designer. In order to address this requirement, switching power supply controllers have incorporated multiple features and operating modes, which can be enabled and configured by a power supply designer. Exemplary features and operating modes include over-temperature, over-voltage, and over-current protection modes. Multiple modulation modes may also be enabled, which impact output characteristics (such as output ripple and output regulation) as well as input characteristics (such as power factor correction). Unfortunately, the goal of providing compact and low cost power supply solutions is often at odds with the goal of maximizing power supply functionality and performance. Accordingly, it is desirable to provide a compact and low cost power supply that enables a wide range of programmable features and operating modes.

SUMMARY

Embodiments described herein describe a compact and efficient power supply controller that controls a power supply. The power supply can be, for example, a switching flyback power converter. The power supply is configured to provide power to an output load, such as an LED load. The power supply can provide power to the output load via, for example, a primary winding of a transformer to transfer energy to its secondary winding.

The power supply controller includes a first terminal that provides supply voltage to the controller. The controller also includes a second terminal coupled to a switch external to the controller, the switch is part of a power converter controlled by the controller, wherein the second terminal is used for an initial power up of the power converter when the switch is turned on and used for a second functionality when the switch is turned off.

In one embodiment, the switch is a depletion-mode MOSFET, and the first terminal is coupled to a source terminal of the switch and the second terminal is coupled to a gate terminal of the switch.

In one embodiment, the switch is turned off when a voltage level of the second terminal is less than a sum of a voltage level of the first terminal and a threshold voltage of the switch.

In one embodiment, the switch is turned on when a voltage level of the second terminal is more than a sum of a voltage level of the first terminal and a threshold voltage of the switch.

In one embodiment, the switch is an n-type depletion-mode MOSFET.

In one embodiment, the second functionality is an over temperature protection by estimating an ambient temperature of the converter.

In one embodiment, the controller estimates the ambient temperature by measuring a voltage drop across a negative temperature coefficient resistor coupled to the second terminal.

In one embodiment, the second functionality is controlling of a brightness of a light emitting diode powered by the power converter.

In one embodiment, the controller controls the brightness by receiving a pulse width modulation (PWM) signal at the second terminal.

In one embodiment, the controller controls the brightness based on a toggling frequency of the received AC input line voltage signal.

In one embodiment, the second functionality is communicating data by coupling the second terminal to a 1-wire serial interface.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Embodiments of the present disclosure relate to power supplies and more specifically to compactness of power supply controllers. A power converter controller circuit includes a first terminal for providing supply voltage to the controller circuit and a second terminal coupled to a switch external to the controller circuit. The second terminal is used for initial power up of the power converter when the switch is turned on and is used for a second functionality when the switch is turned off.

Figure 1:
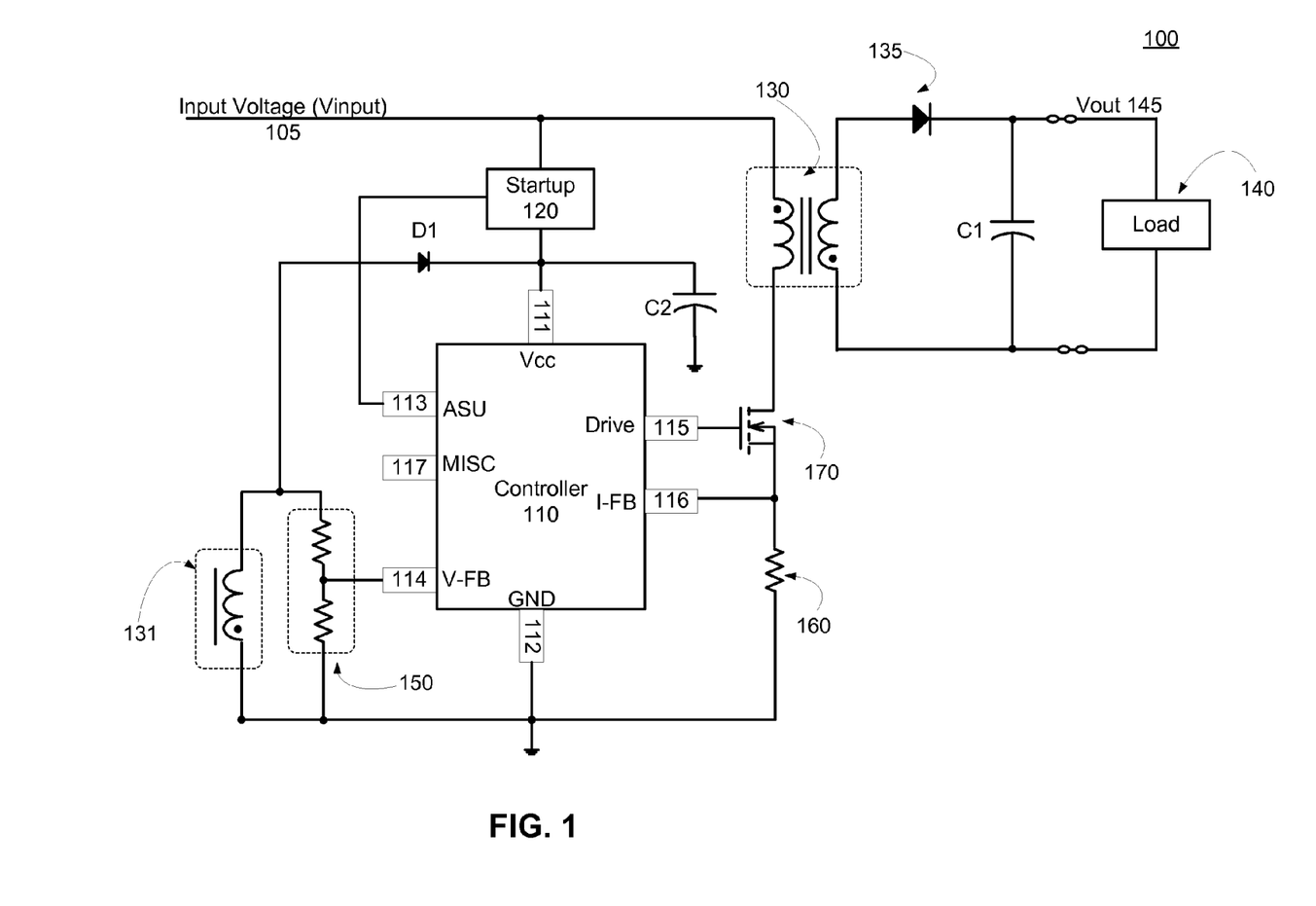
FIG. 1 illustrates a block diagram of a typical switching power converter, according to one embodiment.

FIG. 1 illustrates a block diagram of a typical switching power converter (e.g., power converter 100), according to one embodiment. Power converter 100 includes, among other components, controller 110, startup block 120, transformer 130, load 140, voltage sensing 150, current sensing 160, power device 170, and rectifying diode 135. Power converter 100 receives alternating current (AC) input voltage (Vinput) 105 that is to be converted to a regulated direct current (DC) voltage and delivered to load 140. In one embodiment, Vinput 105 can be rectified by a rectifier bridge (not shown) as a part of power converter 100. Alternatively, Vinput 105 can be previously rectified before reaching power converter 100.

Power converter 100 includes controller 110 that controls operating modes of power converter 100. For example, controller 110 controls when power converter 100 is operated in a constant on-time mode and when power converter 100 is operated in constant power mode. Controller 110 controls power converter 100 by turning on and off power device 170. Power device 170 can be a power MOSFET device that can be operated as a switch. Power device 170 is connected in series with primary winding of transformer 130 such that when controller 110 turns on power device 170, current flows through primary winding of transformer 130. And when controller 110 turns off power device 170, current does not flow through primary winding of transformer 130. Controller 130 can control power device 170 using terminal Drive 115.

Controller 110 can receive supply voltage using two terminals, Vcc 111 and GND 112. Controller 110 typically includes a terminal, ASU 113, to provide a startup signal to trigger startup block 120 that provides supply voltage to controller 110 as a power-on-reset (POR) condition. Startup 120 can include a switch (e.g., depletion-mode MOSFET) that aids in providing supply voltage to controller 110. Controller 110 also includes terminal V-FB 114 that helps in voltage sensing through an auxiliary winding 131 of transformer 130 and a resistor network 150. Auxiliary winding 131 provides a representation of output voltage (Vout) 145 delivered to load 140 based on a ratio of number of turns between the secondary and auxiliary windings. A resistor divider of resistor network 150 provides a representation of Vout 145 at auxiliary winding 131 based on a ratio of resistor values of resistor network 150. After power converter 100 goes through initial power up sequence, diode D1 and capacitor C2 provide supply voltage to Vcc 111 terminal through auxiliary winding 131.

Controller 110 further includes terminal I-FB 116 that aids in a current sensing through resistor 160 connected in series with power device 170. As discussed above, when power device 170 is turned on, a current flows through the primary winding of transformer 130. The current flowing through the primary winding of transformer 130 also flows through power device 170 and further through resistor 160. Controller 110 can sense the current flowing through the primary winding of transformer 130 by sensing a voltage across resistor 160 and calculating the current flowing through resistor 160. Power converter 100 also includes diode 135 functioning as an output rectifier and capacitor C1 functioning as an output filter. The resulting regulated output voltage Vout 145 is delivered to load 140. An additional resistor (not shown) can be added in parallel to load 140 that can act as a pre-load and is typically used for stabilizing the output in case of no load conditions of power converter 100.

In some embodiments, controller 110 can include additional functionalities such as, for example, over-temperature protection by sensing an ambient temperature, analog dimming of a light-emitting diode (LED) load, provide a serial wire interface (e.g., 1-wire serial interface), etc. In conventional power converters (e.g., power converter 100), the above-listed exemplary functions are implemented by including a separate dedicated terminal(s) in controller 110. For example, terminal MISC 117 represents a terminal that can be used for one of the above-listed exemplary functions that can be implemented by controller 110 for power converter 100.

Figure 2:
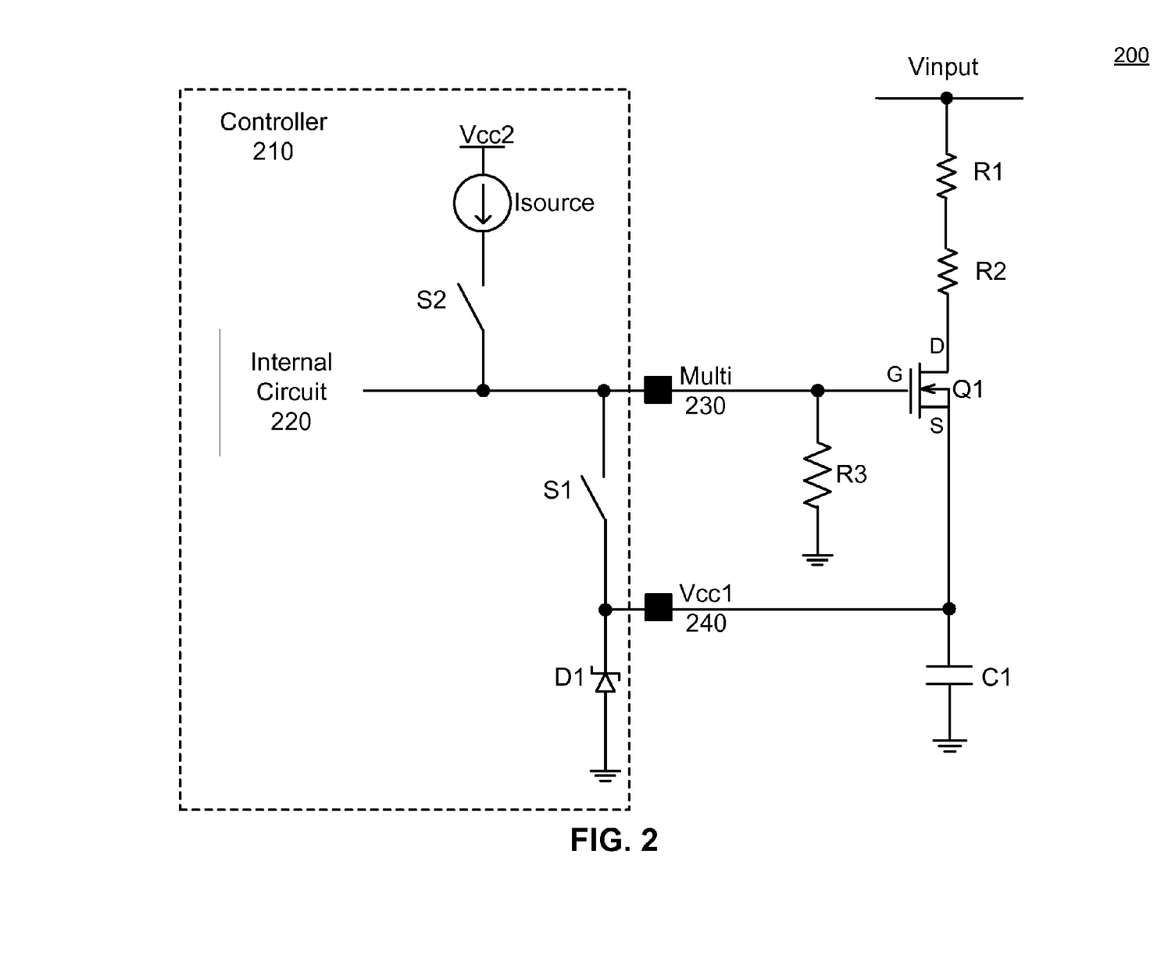
FIG. 2 illustrates a block diagram of a switching power converter controller including a multi-function terminal, according to one embodiment.
Figure 3:
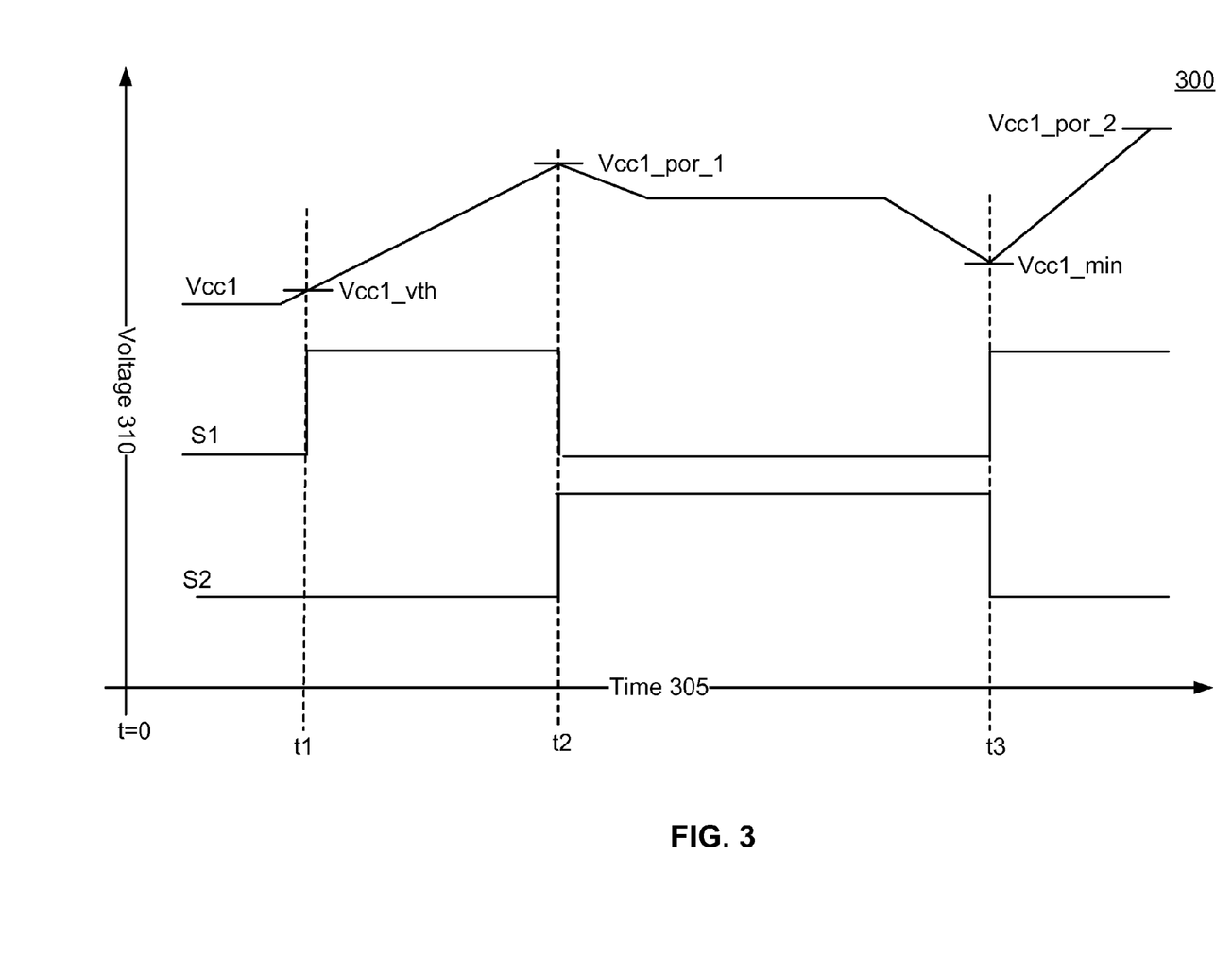
FIG. 3 illustrates a timing diagram of a switching power converter controller, according to an embodiment depicted in FIG. 2.

FIG. 2 illustrates a block diagram of a power converter controller including a multi-function terminal, according to one embodiment. FIG. 2 includes a portion of controller 210 depicted in a dotted rectangular box. The other portion of FIG. 2 includes circuitry that is a part of a power converter (e.g., power converter 100) itself. For example, resistors R1 and R2, MOSFET Q1, and capacitor C1 can be a part of a startup circuit (e.g., startup 120) of the power converter. An exemplary device for Q1 is a depletion-mode MOSFET. An operation of the power converter controller of FIG. 2 that includes a multi-function terminal is depicted in FIG. 3 as a timing diagram. The operation of the multi-function terminal (e.g., Multi 230) will be described in conjunction with FIGS. 2 and 3. FIG. 3 shows time 305 as x-axis (independent axis) and voltage 310 as y-axis. FIG. 3 depicts voltage waveforms for Vcc1 terminal 240, and switches S1 and S2 over time.

When input AC voltage increases, Vinput of FIG. 2 also begins to increase. The initial voltage condition at a gate (G) and a source (S) terminals of depletion-mode MOSFET (Q1) is zero volts. A depletion-mode MOSFET is in a turned-on state when a voltage delta between the MOSFET's gate and source (Vgs) is zero. An n-type depletion-mode MOSFET has a negative value for a threshold voltage. For example, threshold voltage of −3.3V indicates that an n-type depletion-mode MOSFET is turned-on as long as its Vgs is higher than −3.3V (e.g., Vg=0 and Vs is less than 3.3V). In other words, to turn-off the exemplary n-type depletion-mode MOSFET, an applied Vgs needs to be lower than −3.3V (e.g., Vg=0 and Vs is more than 3.3V). At an initial condition (t=0), Multi terminal 230 (Q1's Vg) is equal to zero volts. Accordingly, as long as Vcc1 terminal 240 is lower than an absolute value of Q1's threshold voltage (e.g., 3.3V; Vcc1 with of FIG. 3), Q1 is in a turned-on state and current flows through resistors R1 and R2, and charges capacitor C1. In some embodiments, Vcc1_vth can be set to a value lower than an absolute value of Q1's threshold voltage.

When Vcc1 terminal 240 reaches a voltage level of Vcc1_vth (e.g., absolute threshold voltage of Q1), switch S1 can be turned on. Switch S1 is connected between Multi terminal 230 and Vcc1 terminal 240 such that turning on switch S1 ensures that Q1 is also turned on. When switch S1 is turned on, Vgs of Q1 is set to zero volts thereby ensuring that Q1 is turned on as zero volts is always greater than a negative voltage (threshold voltage of n-type depletion-mode MOSFET is always a negative value). That is, voltage level for Multi terminal 230 is set to be equal to a voltage level of Vcc1 terminal 240. This is depicted in FIG. 3 as time=t1, when a rising pulse is shown for S1. When S1 is turned on and thereby ensuring that Q1 is also turned on, a voltage level for Vcc1 terminal 240 increases, as depicted in FIG. 3, and capacitor C1 continues to charge up. Switch S1 is turned on until Vcc1 terminal 240 reaches a predetermined voltage level, Vcc1_por_1, as depicted in FIG. 3.

When Vcc1 terminal 240 reaches a predetermined voltage level, Vcc1_por_1, switch S1 is turned off to turn off depletion-mode MOSFET Q1 and switch S2 is turned on. In some scenarios, a certain delay is required between the turn-off of S1 and the turn-on of S2 to avoid shoot-through. FIG. 3 depicts this transition at time=t2 by a low pulse for S1 and high pulse for S2. At time=t2, Vcc1 terminal 240 is at a voltage level, Vcc1_por_1. When switch S1 is turned off and switch S2 is turned on, voltage level on Multi terminal 230 is going to change from Vcc1_por_1 to a new value that is based on Vcc2 and resistor R3, where Vcc2 is the supply voltage of the current source, Isource, and R3 is a resistor connected between Multi terminal 230 and ground. After switch S2 is turned on, a voltage level for Multi terminal 230 will depend on a voltage division between resistor R3 and the rest of the circuit comprising Isource and switch S2. The maximum voltage for Multi terminal 230 when switch S2 is turned on is Vcc2. When switch S2 is turned on and switch S1 is turned off, there is a condition related to Vcc1, Vcc2, and Vth of Q1 to ensure that Q1 is turned off as discussed below.

For an n-type depletion-mode MOSFET Q1, the condition to ensure that Q1 is turned off is that a voltage difference between Q1's gate and source terminals (Vgs) should be less than Q1's threshold voltage (Vth). That is, Vgs<Vth. When S1 is off and S2 is on, Vs (source of Q1) is equal to Vcc1 and Vg (gate of Q1) is equal to Vmulti. As discussed above, the maximum value of Vmulti is Vcc2. Accordingly, for Q1 to be turned off, it is sufficient to meet the condition where Vcc2−Vcc1<Vth. In other words, Vcc1>Vcc2−Vth. For example, Vth for an n-type depletion-mode MOSFET is −3.3V. When Vcc2 is set to 3.3V, the condition for Q1 to be turned off is given by Vcc1>6.6V. Accordingly, a minimum value for Vcc1 is set to Vcc2−Vth. For example, a minimum value for Vcc1 is depicted as Vcc1_min in FIG. 3. When switch S1 is turned off, Vcc1 holds its value through capacitor C1. During some fault conditions, the power converter shuts down, and capacitor C2 discharges such that when a voltage level for Vcc1 terminal 240 falls below Vcc1_min, switch S1 can then be turned on and S2 can be turned off to charge up capacitor C1 again and raise the voltage level for Vcc1 terminal 240 to a level Vcc1_por_2 for another POR restart. In some embodiments, the voltage level Vcc1_por_2 can be different from Vcc1_por_1. Alternatively, Vcc1_por_2 can be same as Vcc1_por_1.

Another condition on a maximum value of Vmulti can be calculated similar to a condition on Vcc1 discussed above. As discussed above, for Q1 to remain turned off, Vgs<Vth, where Vg=Vmulti, Vs=Vcc1. Accordingly, Vmulti−Vcc1<Vth, which means that Vmulti<Vcc1+Vth. Therefore, for Q1 to remain turned off, a maximum value of voltage level at Multi terminal 230 is set to be Vcc1+Vth. In other words, if a voltage level of Multi terminal 230 is above Vcc1+Vth, Q1 is turned on, and if the voltage level of Multi terminal 230 is below Vcc1+Vth, Q1 is turned off.

As discussed above, Multi terminal 230 is being used to turn on Q1 to charge up capacitor C1 (and to set a voltage level for Vcc1) for initial power up until Vcc1 reaches a predetermined Vcc1_por_1. Multi terminal 230 is also being used to charge up capacitor C1 whenever the charge on C1 falls below a minimum value as described above as Vcc1_min. But during a time frame when time is between t2 and t3, where a voltage level for Vcc1 is above Vcc1_min, Multi terminal 230 is not being used to charge up capacitor C1. Accordingly, it is possible to use Multi terminal 230 when a voltage level of Vcc1 terminal 230 is above Vcc1_min for functionality other than for initial power up of power converter 100. When a voltage level of Vcc1 terminal 230 is above Vcc1_min, Q1 is turned off and Multi terminal 230 can be used for a second functionality. In other words, when a voltage level on Multi terminal 230 is less than Vcc1+Vth, Multi terminal 230 can be used for functionality other than (i.e., second functionality) for starting up of the power converter. In summary, Multi terminal 230 can be used for a first functionality for initial power up of power converter when its voltage level is higher than Vcc1+Vth, where Vcc1 is a voltage level at a source terminal of a switch (i.e., power device 170) connected to Multi terminal 230 and Vth is a threshold voltage to turn on the switch. Multi terminal 230 can also be used for a second functionality of power converter when its voltage level is lower than Vcc1+Vth.

An exemplary second functionality for using Multi terminal 230 is for an over temperature protection (OTP). In FIG. 2, resistor R3 can be a negative temperature coefficient (NTC) resistor that can be used to sense an ambient temperature of power converter 100. As understood by a person skilled in the art, a resistance of an NTC resistor decreases as the ambient temperature increases. Accordingly, by monitoring a voltage drop across NTC resistor R3, controller 210 can sense an ambient temperature of power converter 100 and thereby enable a protection circuit when a sensed temperature increases above a predetermined threshold value. Another circuit implementation of an exemplary embodiment for OTP is described below with reference to FIG. 4.

Figure 4:
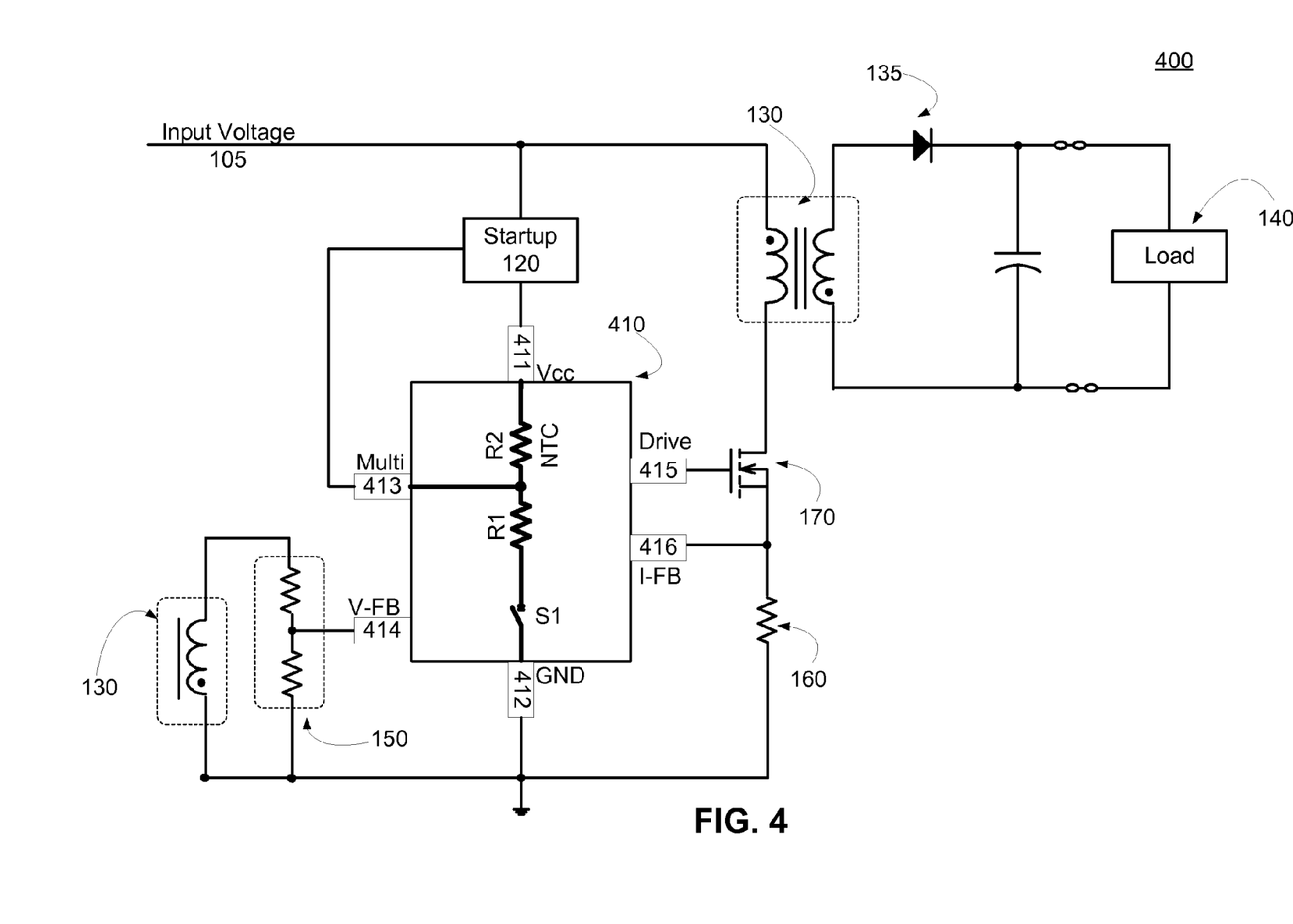
FIG. 4 illustrates a block diagram depicting a multi-function terminal being used for a secondary function to sense an ambient temperature, according to one embodiment.

FIG. 4 illustrates a block diagram depicting a multi-function terminal being used for a secondary function to sense an ambient temperature, according to one embodiment. FIG. 4 depicts power converter 400 that is similar to power converter 100 discussed above with reference to FIG. 1 except that controller 410 includes a multi-function terminal, Multi 413, that can implement functionalities of two pins, ASU 113 and MISC 117. Controller 410 includes six terminals as follows: Vcc 411, GND 412, Multi 413, V-FB 414, Drive 415, and I-FB 416. The operation of terminals Vcc 411, GND 412, V-FB 414, Drive 415, and I-FB 416 is same as the operation of terminals Vcc 111, GND 112, V-FB 114, Drive 115, and I-FB 116 respectively as describe above with reference to FIG. 1.

Multi terminal 413 operates similar to Multi terminal 230 described above with reference to FIG. 2 when Multi terminal 413 turns on a switch (not shown) included within startup 120 during initial power up until Vcc 411 reaches a predetermined voltage level (e.g., Vcc1_por_1 of FIG. 3). Multi terminal 413 operates similar to Multi terminal 230 also during a time period when Vcc 411 falls below a minimum value as described above as Vcc1_min with reference to FIGS. 2 and 3. Multi terminal 413 is used for a second functionality to sense ambient temperature when Multi terminal 413 is not used for initial power up of power converter. An exemplary scenario is when a voltage level of Vcc 411 is above a minimum value (e.g., Vcc1_min of FIG. 3). The functionality of sensing ambient temperature can be implemented by connecting resistors R1 and R2, and switch S1 between terminals Vcc 411, Multi 413, and GND 412, as depicted in FIG. 4. In this exemplary embodiment, switch S1 is turned on when a voltage level of Vcc 411 is above a minimum value (e.g., Vcc1_min of FIG. 3) such that current flows through resistors R1 and R2. Said differently, switch S1 of FIG. 4 is turned on when a switch of startup 120 (e.g., FIG. 2's Q1) is turned off.

When switch S1 is turned on, current flows through R1 and R2. In this exemplary embodiment, R2 is an NTC resistor. Multi terminal 413 can monitor a voltage drop between resistors R1 and R2 to estimate an ambient temperature of controller 410 and thereby of power converter 400. In one embodiment, resistor R2 can be implemented inside controller 410. Alternatively, resistor R2 can be implemented external to controller 410 and can be placed close to a device that has the highest temperature within power converter 400 (e.g, transformer 130 and/or power device 170). In some embodiments, R1 (or R1 and R2) can be an NTC resistor.

Figure 5:
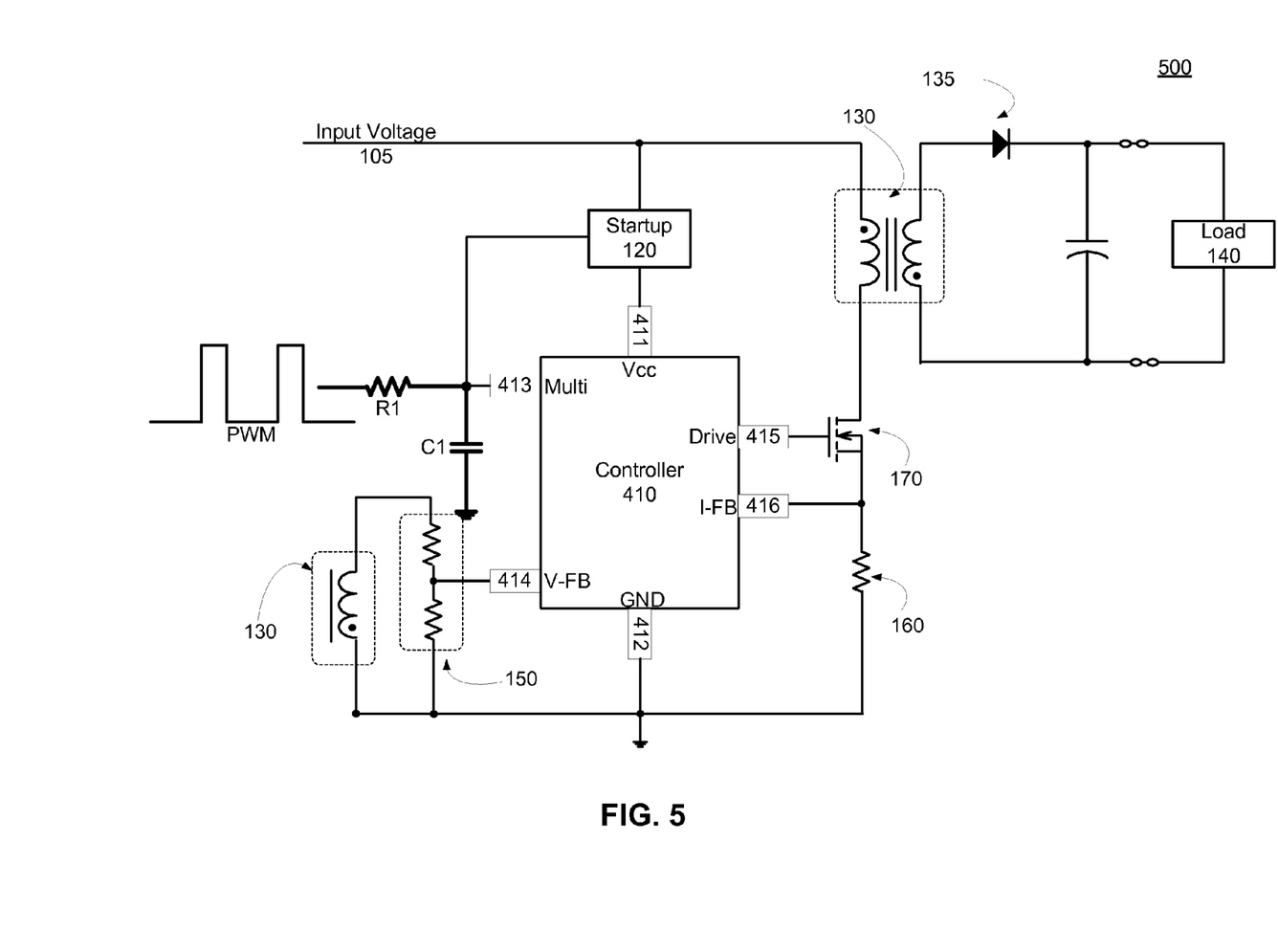
FIG. 5 illustrates a block diagram depicting a multi-function terminal being used for a secondary function to control an analog dimming capability, according to one embodiment.

FIG. 5 illustrates a block diagram depicting a multi-function terminal being used for a secondary function to control an analog dimming capability, according to one embodiment. FIG. 5 depicts power converter 500 that is similar to power converter 400 discussed above with reference to FIG. 4 except that Multi terminal 413 is configured differently between power converter 500 and power converter 400. While Multi terminal 413 is configured to sense ambient temperature in power converter 400, Multi terminal 413 is configured to control an analog dimming capability of an LED load in power converter 500.

Multi terminal 413 of power converter 500 is used for a second functionality to control analog dimming function of an LED load when Multi terminal 413 is not used for an initial power up of power converter. An exemplary scenario is when a voltage level of Vcc 411 is above a minimum value (e.g., Vcc1_min of FIG. 3). The functionality to control analog dimming function can be implemented by a resistor R1 and capacitor C1 connected in a low-pass filter configuration and coupled to Multi terminal 413, as depicted in FIG. 5. In some embodiments, Multi terminal 413 can either receive a pulse width modulated (PWM) signal over, for example, a Bluetooth connection, or sense an input line voltage using a voltage divider. In the Bluetooth scenario, the input signal can be received remote to the power converter from a smart phone. And in the input line input voltage sensing scenario, the input can be received from a wall switch connected to alternating current (AC) input line voltage. In an exemplary embodiment, a pulse width modulated (PWM) signal is sent through Multi terminal 413 when a switch of startup block 120 is off such that an LED bulb's brightness can be controlled in proportion to a duty-cycle of the PWM signal. Another example of controlling the LED bulb's brightness is by monitoring a frequency of toggling of the input voltage signal detected at Multi terminal 413. For example, if an input voltage signal's toggling frequency is detected as two for a given time-frame, then a brightness of LED bulb can be set to 75% brightness. Another example is if an input voltage signal's toggling frequency is detected as three for a given time-frame, then a brightness of LED bulb can be set to 50% brightness, etc.

Other exemplary functionalities that can be implemented on Multi terminal 413 when Multi terminal 413 is not used for initial power up include a 1-wire serial interface to communicate data (both input and output) with controller 410 and thereby with power controller 400 (or power controller 500). For example, a 1-wire serial interface can include 1-bit digital signal that can be to represent a condition to either turn-on or turn-off an LED light bulb. A condition representing turning on of the LED bulb can be mapped to a logic high of the 1-wire serial interface and a turning off of the LED bulb can be mapped to a logic low.

By detecting a logic low signal, for example, the LED bulb can be turned off by setting the output voltage of the power converter lower than a threshold voltage required to turn on the LED bulb.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of symbolic representations of operations on information. These representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the operations described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A power converter controller comprising:
   a first terminal configured to provide supply voltage to the controller; and
   a second terminal configured to couple to a switch external to the controller, the switch is part of a power converter controlled by the controller, the controller sensing a current flowing through a primary winding of a transformer of the power converter, wherein the second terminal is further configured to be used for an initial power up of the power converter when the switch is turned on and to be used for a second functionality based on a voltage level of the second terminal being less than a sum of a voltage level of the first terminal and a threshold voltage of the switch, the switch is a depletion-mode MOSFET.

2. The controller of claim 1, wherein the first terminal is configured to couple to a source terminal of the switch and the second terminal is configured to couple to a gate terminal of the switch.

3. The controller of claim 1, wherein the switch is turned off when the voltage level of the second terminal is configured to be less than the sum of the voltage level of the first terminal and the threshold voltage of the switch.

4. The controller of claim 1, wherein the switch is turned on when the voltage level of the second terminal is configured to be more than the sum of the voltage level of the first terminal and the threshold voltage of the switch.

5. The controller of claim 1, wherein the switch is an n-type depletion-mode MOSFET.

6. The controller of claim 1, wherein the second functionality is an over temperature protection by estimating an ambient temperature of the converter.

7. The controller of claim 6, wherein the controller estimates the ambient temperature by measuring a voltage drop across a negative temperature coefficient resistor coupled to the second terminal.

8. The controller of claim 1, wherein the second functionality is controlling of a brightness of a light emitting diode powered by the power converter.

9. The controller of claim 8, wherein the controller controls the brightness by receiving a pulse width modulation signal at the second terminal.

10. The controller of claim 9, wherein the controller controls the brightness based on a toggling frequency of the received AC input line voltage.

11. The controller of claim 1, wherein the second functionality is communicating data to control a brightness of a light emitting diode powered by the switching power converter by coupling the second terminal to a 1-wire serial interface.

* * * * *